United States Patent
Maezawa et al.

(10) Patent No.: US 7,801,010 B2
(45) Date of Patent: Sep. 21, 2010

(54) COUPLING LENS AND OPTICAL PICKUP DEVICE

(75) Inventors: Koji Maezawa, Ibaraki (JP); Aya Morishima, Ibaraki (JP); Mitsuhiro Miyauchi, Ibaraki (JP)

(73) Assignee: Hitachi Maxell, Ltd., Ibaraki-shi (JP)

(*) Notice: Subject to any disclaimer, the term of this patent is extended or adjusted under 35 U.S.C. 154(b) by 519 days.

(21) Appl. No.: 11/984,803

(22) Filed: Nov. 21, 2007

(65) Prior Publication Data

US 2008/0137517 A1    Jun. 12, 2008

(30) Foreign Application Priority Data

Nov. 22, 2006  (JP) .............................. 2006-316170
Dec. 6, 2006   (JP) .............................. 2006-329874

(51) Int. Cl.
*G11B 7/135* (2006.01)

(52) U.S. Cl. ................................. 369/112.23
(58) Field of Classification Search ........................ None
See application file for complete search history.

(56) References Cited

U.S. PATENT DOCUMENTS

| 7,056,037 B2 * | 6/2006 | Ozeki et al. ............... 385/92 |
| 7,369,481 B2 * | 5/2008 | Kimura et al. ......... 369/112.23 |
| 2007/0211600 A1 * | 9/2007 | Ikenaka ................. 369/112.08 |

FOREIGN PATENT DOCUMENTS

| JP | A 2002-303788 | 10/2002 |
| JP | A 2004-185746 | 7/2004 |

* cited by examiner

*Primary Examiner*—Daniell L Negrón
*Assistant Examiner*—Parul Gupta
(74) *Attorney, Agent, or Firm*—Oliff & Berridge, PLC

(57) ABSTRACT

A coupling lens for chromatic aberration correction is placed between a light source and an objective lens for focusing light beams with a plurality of wavelengths on an information recording surface of an optical recording medium, and at least one surface of the coupling lens includes a plurality of annular zones having a step concentric with an optical axis. The coupling lens is designed so that when a wavelength $\lambda_1 = 380$ to 430 nm and a height of the step is $d = m_1 \lambda_1 / (n_1 - 1)$ where $m_1$ is an actual number and $n_1$ is a refractive index of the coupling lens at the wavelength $\lambda_1$, $9.9 \leq m_1 \leq 10.1$ is satisfied.

15 Claims, 9 Drawing Sheets

COUPLING LENS AND OPTICAL PICKUP DEVICE

BACKGROUND OF THE INVENTION

1. Field of the Invention

The present invention relates to a coupling lens which can be used for a compatible optical disc apparatus that is compatible with different types of optical recording media, such as a compact disc (CD), a digital versatile disc (DVD), a High-Density DVD (HD-DVD) and a Blu-ray Disc, and which is a multi-wavelength optical system that uses a plurality of kinds of monochromatic light, and an optical pickup device using the coupling lens.

2. Description of Related Art

With a recent increase in the capacity and the density of optical discs, new-standard high density optical discs such as HD-DVD and Blu-ray Disc are proposed and put into practical use. Accordingly, there is a demand for a compatible optical disc apparatus which permits recording and playback of different kinds of optical discs including the new-standard high density optical discs as well as CD and DVD.

In order to enable recording and playback of a high density optical disc with an improved recording capacity, it is necessary to reduce the diameter of an optical spot that is obtained by an optical system of an optical pickup device which is used for an optical disc apparatus. Because the spot diameter is proportional to $\lambda/NA$ (where $\lambda$ is a wavelength of a light source and NA is a numerical aperture of an objective lens), the spot diameter can be reduced by shortening the wavelength or increasing the numerical aperture. As for the shortening of the wavelength, a blue-violet semiconductor laser with a wavelength of about 400 nm has been studied and put into practice.

Generally in an optical pickup device, a laser power for recording on an optical disc is higher than a laser power for playing back an optical disc. Therefore, a phenomenon that a wavelength of light increases by several nanometers, which is called mode hopping, occurs upon switching from playback to recording. With the mode hopping, a focus position shifts. Although the focus shift can be eliminated by auto-focusing an objective lens, the focus shift increases if a wavelength of light is as short as about 400 nm. Accordingly, a recording error due to the focus shift occurs during the period of several nanoseconds until the auto-focus is locked in. It is thereby necessary to provide correction for reducing the focus shift or chromatic aberration due to the mode hopping.

Regarding this, Japanese Unexamined Patent Application Publication No. 2002-303788 discloses a lens which is designed to correct chromatic aberration by the diffraction of a diffraction pattern. Further, Japanese Unexamined Patent Application Publication No. 2004-185746 discloses a coupling lens which is designed to correct chromatic aberration without deteriorating light use efficiency by a method that does not use the diffraction.

However, the method of using the diffraction which is disclosed in Japanese Unexamined Patent Application Publication No. 2002-303788 increases a total number of annular zones and it causes the degradation of diffraction efficiency or light use efficiency. Further, the coupling lens for chromatic aberration correction which is disclosed in Japanese Unexamined Patent Application Publication No. 2004-185746 is intended for the exclusive use of a blue-violet semiconductor laser with a wavelength of about 400 nm. It cannot be used as a compatible objective lens which enables the use of two or more wavelengths including a wavelength for CD (about 780 nm), a wavelength for DVD (about 650 nm) and so on. It therefore fails to reduce the size of an optical pickup device by using a three-wavelength compatible objective lens which is compatible with all of CD, DVD and the above-described new-standard high density optical discs so as to have an optical system in common for the three wavelengths.

In addition, in the case where an optical system is used in common for three wavelengths so as to be compatible with all of CD, DVD and the new-standard high density optical discs, if a step height in a annular zone of the coupling lens for chromatic aberration correction is set by placing a high priority on the correction of chromatic aberration at a laser wavelength for a high density optical disc which has the shortest wavelength, incident light to an objective lens becomes finite at a laser wavelength for CD. Thus, coma aberration which occurs when an objective lens shifts during tracking becomes a problem.

SUMMARY OF THE INVENTION

The present invention has been accomplished to solve the above problems and an object of the present invention is thus to provide a coupling lens for chromatic aberration correction with high light use efficiency which can be used with two or more wavelengths. Another object of the present invention is to provide a coupling lens for chromatic aberration correction which has no coma aberration that occurs when an objective lens shifts.

According to one aspect of the present invention, there is provided a coupling lens for chromatic aberration correction that is placed between a light source and an objective lens for focusing light beams with a plurality of wavelengths on an information recording surface of an optical recording medium, and at least one surface of the coupling lens includes a plurality of annular zones having a step concentric with an optical axis. The coupling lens is designed so that, when a wavelength $\lambda_1=380$ to $430$ nm and a height of the step is $d=m_1\lambda_1/(n_1-1)$ where $m_1$ is an actual number and $n_1$ is a refractive index of the coupling lens at the wavelength $\lambda_1$, $9.9 \leq m_1 \leq 10.1$ is satisfied. It is thereby possible to provide a coupling lens for chromatic aberration correction with high light use efficiency which can be used with two or more wavelengths.

According to another aspect of the present invention, there is provided a coupling lens for chromatic aberration correction that is placed between a light source and an objective lens for focusing light beams with a plurality of wavelengths on an information recording surface of an optical recording medium, and at least one surface of the coupling lens includes a plurality of annular zones having a step concentric with an optical axis. The coupling lens is designed so that, when a height of the step formed within an effective radius A at a specific wavelength $\lambda$ in which a light beam output from the coupling lens is finite is $d_A$, and a height of the step formed in a region through which a light beam with the specific wavelength $\lambda$ can pass only when an optical axis of the objective lens shifts from the optical axis of the coupling lens is $d_B$, $d_B > d_A$ is satisfied. It is thereby possible to provide a coupling lens for chromatic aberration correction with high light use efficiency which can be used with two or more wavelengths and which has no coma aberration that occurs when an objective lens shifts.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Exemplary embodiments of the present invention are described hereinafter with reference to the drawings. The present invention, however, is not limited to the embodiments described hereinbelow. The following description and the accompanying drawings are appropriately shortened and simplified to clarify the explanation.

First Embodiment

In a first embodiment of the present invention, a coupling lens of the present invention is applied to an optical disc apparatus. Although a module which includes three light sources, one for CD, one for DVD and one for HD-DVD, is described as an example in the first embodiment, the number of light sources is not limited to three as long as it is two or more.

A coupling lens according to the present invention is designed to have an aspherical shape which, when combined with an objective lens, eliminates or reduces chromatic aberration in an optical path of a light beam that passes through a given optical path height for each of different kinds of optical discs. Chromatic aberration is thereby corrected sufficiently for each kind of optical discs. Further, light loss of diffraction efficiency does not occur because it corrects chromatic aberration only with refracted light without the use of diffraction.

Figures 1A, 1B:
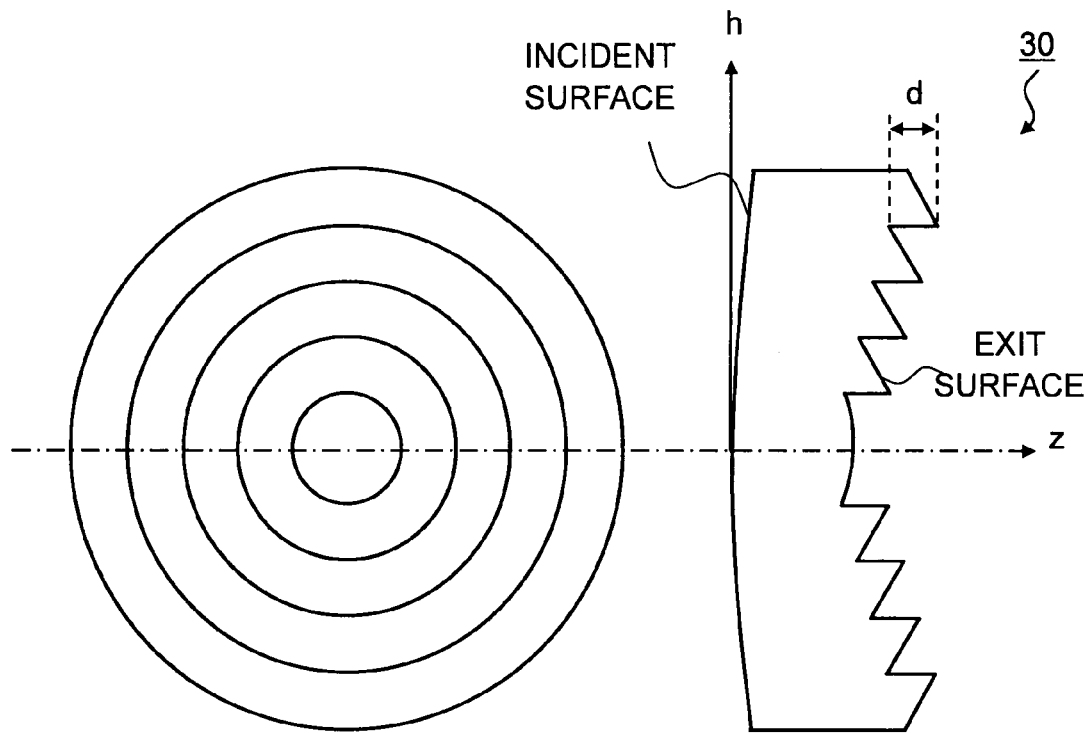
FIG. 1A is a schematic plan view showing a coupling lens according to first and second embodiments of the present invention.
FIG. 1B is a schematic sectional view showing a coupling lens according to the first and second embodiments.

FIGS. 1A and 1B show the structure of a coupling lens 30 according to the present invention. FIG. 1A is a front view, and FIG. 1B is a sectional view of the coupling lens 30. As shown therein, the lens surface on the light exit side has at least two annular zones which are concentric with an optical axis (the axis z in FIG. 1B) in the lens radius direction. Each annular zone has a specific aspherical shape, and a step between adjacent annular zones has a predetermined height d (which is referred to hereinafter as an adjacent step height d). When a distance of an aspherical surface from a tangent plane of an incident surface on an optical axis in coordinate points on the aspherical surface where a height from the optical axis is h is Z (h), a curvature (1/curvature radius) of the aspherical surface on the optical axis is C, a constant of the cone is K, the fourth- to sixteenth-order aspheric coefficients are A4, A6, A8, A10, A12, A14 and A16, respectively, and a constant is B, the aspherical shape in the present invention is represented by the following Expression 1:

$$Z(h) = B + \frac{Ch^2}{1 + \sqrt{1 - (K+1)C^2 \cdot h^2}} + A4 \cdot h^4 + A6 \cdot h^6 + A8 \cdot h^8 + A10 \cdot h^{10} + A12 \cdot h^{12} + A14 \cdot h^{14} + A16 \cdot h^{16}$$

Further, in the coupling lens according to the present invention, the adjacent step height is adjusted so as to correct the chromatic aberration of an objective lens for three wavelengths of an HD-DVD laser (wavelength $\lambda_1$=380 to 430 nm), a DVD laser (wavelength $\lambda_2$=630 to 690 nm) and a CD laser (wavelength $\lambda_3$=760 to 810 nm) in an optical system of an optical pickup device which uses the above three wavelengths. The adjacent step height d can be represented as d=$m_1\lambda_1/(n_1-1)$=$m_2\lambda_2/(n_2-1)$=$m_3\lambda_3/(n_3-1)$ where $m_1$, $m_2$ and $m_3$ are actual numbers, and $n_1$, $n_2$ and $n_3$ are refractive indexes of the coupling lens at wavelengths $\lambda_1$, $\lambda_2$ and $\lambda_3$, respectively. In order to completely eliminate chromatic aberration for the above three wavelengths, all of $m_1$, $m_2$ and $m_3$ should be natural numbers. This is, however, practically impossible. In the coupling lens according to the present invention, $m_1 \approx 10$, $m_2 \approx 6$ and $m_3 \approx 5$ are achieved. More specifically, $9.9 \leq m_1 \leq 10.1$, $5.9 \leq m_2 \leq 6.1$ and $4.9 \leq m_3 \leq 5.1$ are achieved. It is thereby possible to effectively correct chromatic aberration for all of the above three wavelengths.

Figure 2:
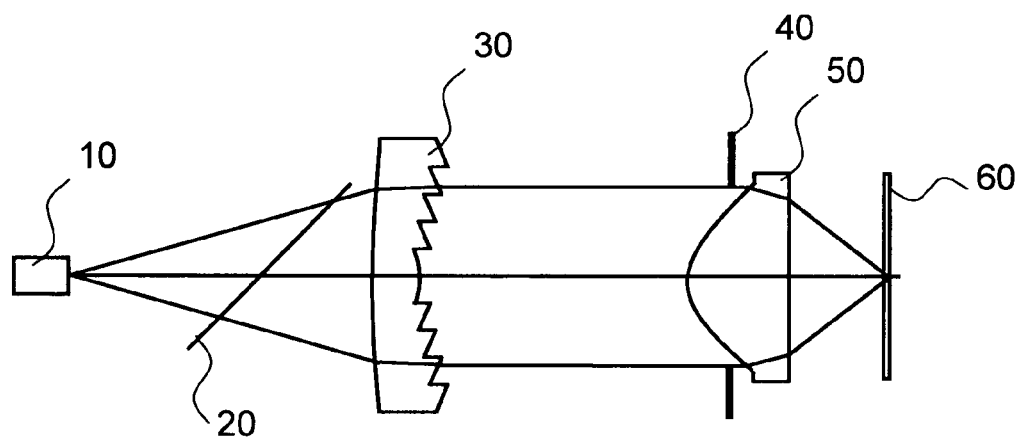
FIG. 2 is a schematic view showing an optical system of an optical pickup device according to the first and second embodiments.

FIG. 2 is a schematic diagram showing the structure of an optical pickup device according to the first embodiment of the present invention. As shown in FIG. 2, the optical pickup device includes a light source 10, a half mirror 20, a coupling lens 30 for chromatic aberration correction, an aperture stop 40, and an objective lens 50.

Referring to FIG. 2, divergent light which is emitted from the light source 10 passes through the half mirror 20 and enters the coupling lens 30 for chromatic aberration correction where it is converted into substantially parallel light to become infinite light. The parallel light then passes through the aperture stop 40 and enters the objective lens 50. The light which has passed through the objective lens 50 is focused on an optical disc 60 by the objective lens 50.

The light which is reflected by the optical disc 60 passes through the objective lens 50 and the coupling lens 30 for chromatic aberration correction and is then reflected by the half mirror 20. The light which is reflected by the half mirror 20 then passes through a detection lens and enters a photodetector (not shown) where photoelectric conversion is performed to generate a focus servo signal, a tracking servo signal, a playback signal and so on.

Example 1

A specific example of the present invention is described hereinafter. An optical pickup device according to an example 1 uses three wavelengths of an HD-DVD laser (wavelength $\lambda_1$=407 nm), a DVD laser (wavelength $\lambda_2$=658 nm) and a CD laser (wavelength $\lambda_3$=785 nm).

In the coupling lens 30 for chromatic aberration correction according to the example 1, the light exit surface shown in FIG. 1B is sectioned into 20 annular zones from the optical axis in the radius direction, and the surface shape of each zone is designed so as to reduce the chromatic aberration of a blue-violet semiconductor laser. Specifically, for the light exit surface and the light incident surface shown in FIG. 1B, the constants B, K, A4, A6, A8, A10 and A12 in Expression 1 are set as shown in the following Tables 1 and 2. In all the annular zones of the light exit surface and the incident surface, A14=A16=0.

TABLE 1

|  | zone | h (inside) (mm) | h (outside) (mm) | B | C | K |
|---|---|---|---|---|---|---|
| Incident surface | — | 0 | 2 | 0 | 51.18388 | 0 |
| Exit surface | 1 | 0 | 0.434072 | 1.5 | −9.078946 | −1.0957186 |
|  | 2 | 0.434072 | 0.613136 | 1.5080393 | −9.081649 | −1.1028383 |
|  | 3 | 0.613136 | 0.750057 | 1.516078599 | −9.084353 | −1.1019999 |
|  | 4 | 0.750057 | 0.865074 | 1.524117899 | −9.087053 | −1.1058027 |
|  | 5 | 0.865074 | 0.966051 | 1.532157199 | −9.089751 | −1.1024311 |
|  | 6 | 0.966051 | 1.057027 | 1.540196499 | −9.09246 | −1.1012829 |
|  | 7 | 1.057027 | 1.140401 | 1.548235798 | −9.095152 | −1.1053145 |
|  | 8 | 1.140401 | 1.217742 | 1.556275098 | −9.097856 | −1.1001369 |
|  | 9 | 1.217742 | 1.290134 | 1.564314398 | −9.100562 | −1.1035769 |
|  | 10 | 1.290134 | 1.358375 | 1.572353698 | −9.103257 | −1.1018831 |
|  | 11 | 1.358375 | 1.42307 | 1.580392997 | −9.105968 | −1.1093129 |
|  | 12 | 1.42307 | 1.484677 | 1.588432297 | −9.108662 | −1.1068974 |
|  | 13 | 1.484677 | 1.543577 | 1.596471597 | −9.111373 | −1.0980311 |
|  | 14 | 1.543577 | 1.600068 | 1.604510897 | −9.114078 | −1.0986869 |
|  | 15 | 1.600068 | 1.654402 | 1.612550196 | −9.116768 | −1.0995001 |
|  | 16 | 1.654402 | 1.706787 | 1.620589496 | −9.11948 | −1.0942672 |
|  | 17 | 1.706787 | 1.757397 | 1.628628796 | −9.1222 | −1.0740908 |
|  | 18 | 1.757397 | 1.806385 | 1.636668095 | −9.124881 | −1.0999588 |
|  | 19 | 1.806385 | 1.853881 | 1.644707395 | −9.127565 | −1.0938974 |
|  | 20 | 1.853881 | 2 | 1.652746695 | −9.13028 | −1.0955512 |

TABLE 2

|  | zone | A4 | A6 | A8 | A10 | A12 |
|---|---|---|---|---|---|---|
| Incident surface | 1 | 0.0001188 | 7.30917E−06 | 7.5616E−07 | 0 | 0 |
| Exit surface | 1 | 5.11246E−05 | 6.76945E−06 | 6.2091E−07 | 7.3045E−09 | 7.93E−10 |
|  | 2 | 4.97957E−05 | 6.82164E−06 | 5.8584E−07 | 1.53517E−08 | 8.07E−11 |
|  | 3 | 4.98204E−05 | 6.8323E−06 | 5.7415E−07 | 1.75617E−08 | −1.035E−10 |
|  | 4 | 4.91226E−05 | 6.79432E−06 | 5.8531E−07 | 1.48171E−08 | 1.204E−10 |
|  | 5 | 4.9655E−05 | 6.72114E−06 | 6.1188E−07 | 8.7533E−09 | 6.162E−10 |
|  | 6 | 4.96476E−05 | 6.81341E−06 | 5.6271E−07 | 1.90808E−08 | −2.354E−10 |
|  | 7 | 4.9036E−05 | 6.65617E−06 | 6.288E−07 | 4.4356E−09 | 9.677E−10 |
|  | 8 | 4.97762E−05 | 6.67103E−06 | 6.1492E−07 | 7.1089E−09 | 7.467E−10 |
|  | 9 | 4.90582E−05 | 6.71517E−06 | 5.882E−07 | 1.25964E−08 | 2.916E−10 |
|  | 10 | 4.93455E−05 | 6.60761E−06 | 6.3109E−07 | 2.9568E−09 | 1.0847E−09 |
|  | 11 | 4.7897E−05 | 6.72274E−06 | 5.7211E−07 | 1.54422E−08 | 5.34E−11 |
|  | 12 | 4.83215E−05 | 6.59971E−06 | 6.2157E−07 | 4.4643E−09 | 9.509E−10 |
|  | 13 | 4.95659E−05 | 6.71374E−06 | 5.6196E−07 | 1.70219E−08 | −8.18E−11 |
|  | 14 | 4.93289E−05 | 6.73868E−06 | 5.4421E−07 | 2.05135E−08 | −3.686E−10 |
|  | 15 | 4.92803E−05 | 6.55708E−06 | 6.2065E−07 | 3.7482E−09 | 1.0014E−09 |
|  | 16 | 4.99046E−05 | 6.6875E−06 | 5.542E−07 | 1.77425E−08 | −1.463E−10 |
|  | 17 | 5.2874E−05 | 6.92774E−06 | 4.36E−07 | 4.29738E−08 | −2.22E−09 |
|  | 18 | 4.8835E−05 | 6.61853E−06 | 5.7334E−07 | 1.29826E−08 | 2.402E−10 |
|  | 19 | 5.00095E−05 | 6.34347E−06 | 6.9313E−07 | −1.3328E−08 | 2.406E−09 |
|  | 20 | 4.94472E−05 | 6.52822E−06 | 6.0172E−07 | 6.1817E−09 | 7.975E−10 |

The adjacent step height d is adjusted so as to correct the chromatic aberration of the objective lens particularly for an HD-DVD laser and also to have the compatibility with the above three wavelengths. Specifically, in the coupling lens for chromatic aberration correction according to the present invention, the adjacent step height d is set to: $d=10*\lambda_1/(n_1-1)=5.98*\lambda_2/(n_2-1)=4.98*\lambda_3/(n_3-1)$, where $n_1$, $n_2$ and $n_3$ are refractive indexes of the objective lens for the wavelengths $\lambda_1$, $\lambda_2$ and $\lambda_3$, respectively, by placing a high priority on the chromatic aberration correction at $\lambda_1=407$ nm, which is an HD-DVD laser.

The center thickness of the coupling lens 30 for chromatic aberration correction is 1.5 mm, and the center thickness of the objective lens 50 is 1.28 mm. PMMA (polymethylmethacrylate) is used for the coupling lens 30 for chromatic aberration correction and the objective lens 50, and PC (polycarbonate) is used for the optical disc 60. The following Table 3 shows the refractive index of those materials at each wavelength. Although a material is not limited to those, the refractive index at each wavelength is preferably 1.45 to 1.55.

TABLE 3

| | Wavelength (nm) | | |
|---|---|---|---|
| | 785 | 658 | 407 |
| PMMA | 1.486076 | 1.489145 | 1.506263 |
| PC | 1.571263 | 1.577753 | 1.619489 |

Figure 3:
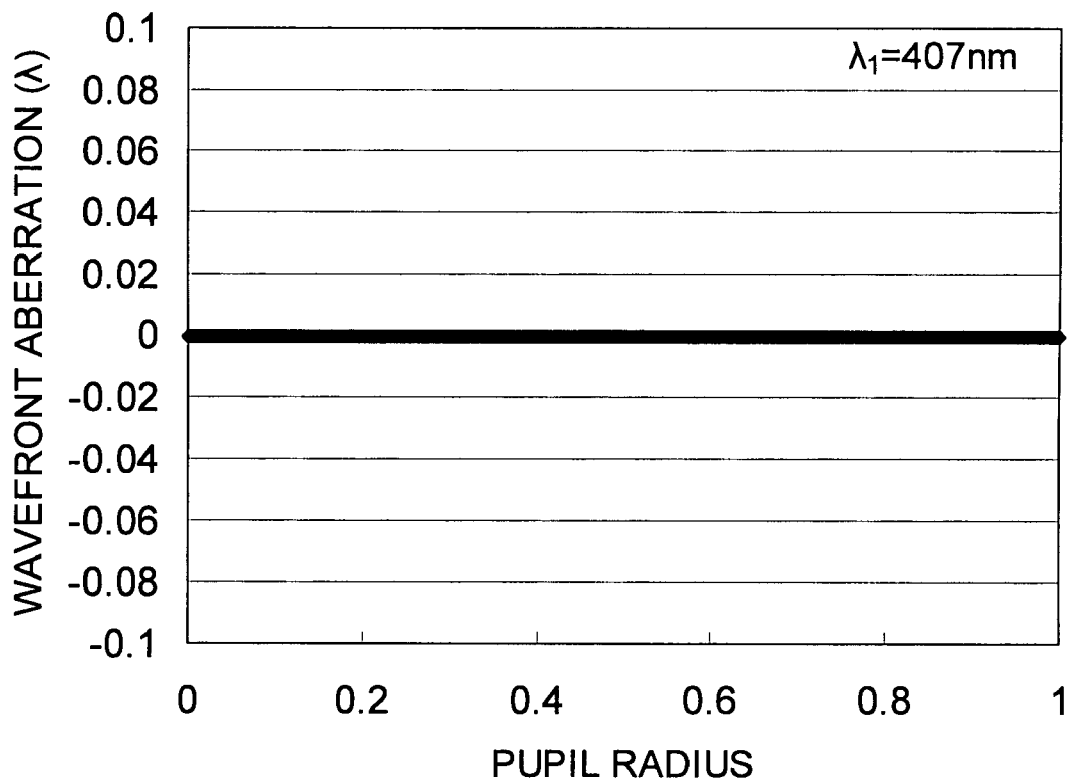
FIG. 3 is a wavefront aberration chart of a light beam with a wavelength of 407 nm which has passed through the coupling lens according to the first embodiment.
Figure 4:
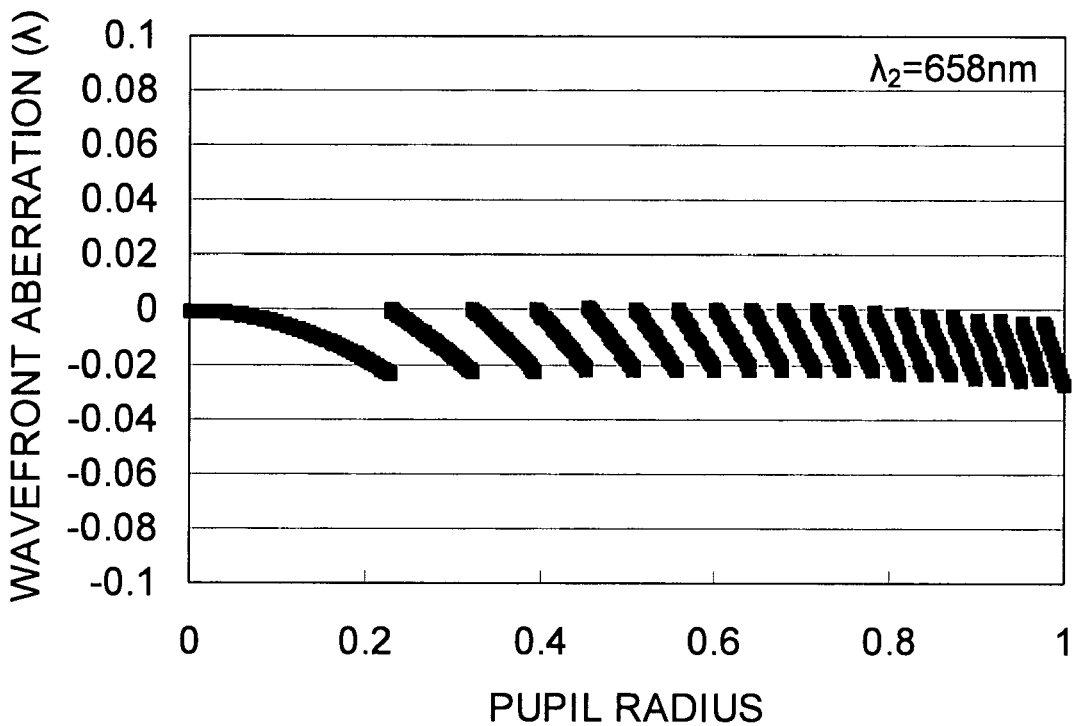
FIG. 4 is a wavefront aberration chart of a light beam with a wavelength of 658 nm which has passed through the coupling lens according to the first embodiment.
Figure 5:
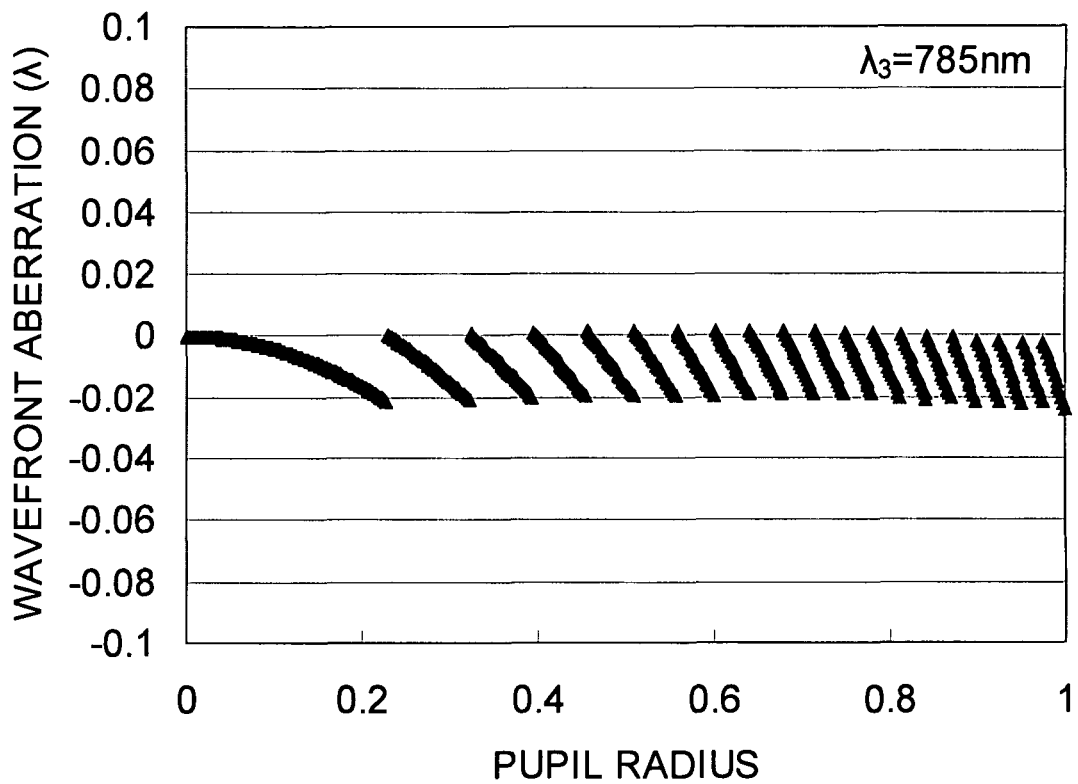
FIG. 5 is a wavefront aberration chart of a light beam with a wavelength of 785 nm which has passed through the coupling lens according to the first embodiment.

FIGS. 3 to 5 are wavefront aberraton charts of the light beam which is emitted from the light source 10 and converted into substantially parallel light by the coupling lens 30. In the charts, the horizontal axis indicates a pupil radius, and the vertical axis indicates wavefront aberration. FIG. 3 shows the case of the wavelength $\lambda_1=407$ nm, FIG. 4 shows the case of the wavelength $\lambda_2=658$ nm, and FIG. 5 shows the case of the wavelength $\lambda_3=785$ nm.

Referring first to FIG. 3, in the case of a blue laser with the wavelength $\lambda_1=407$ nm, wavefront aberration is constant at substantially $0\lambda$. This is because the adjacent step height $d*(n_1-1)$ of the annular zone is just 10 times the wavelength $\lambda_1$.

Referring then to FIG. 4, in the case of the wavelength $\lambda_2=658$ nm, wavefront aberration is a discrete value for each annular zone. This is because the adjacent step height $d*(n_2-1)$ of the annular zone is about 5.98 times the wavelength $\lambda_2$, which is not just 6 times. Still, the wavefront aberration is as small as $0.02\lambda$ at maximum.

Referring further to FIG. 5, in the case of the wavelength $\lambda_3=785$ nm, wavefront aberration is a discrete value for each annular zone, just like the case of the wavelength $\lambda_2=658$ nm. This is because the adjacent step height $d*(n_3-1)$ of the annular zone is about 4.98 times the wavelength $\lambda_3$, which is not just 5 times. Still, the wavefront aberration is as small as $0.02\lambda$ at maximum.

As described above, the coupling lens of the present invention has suitable wavefront aberration characteristics for all of the above three wavelengths.

For an incidence-side surface R1 and an exit-side surface R2 of the objective lens 50, the distance Z (h) (in units of mm) of an aspherical surface from each tangent plane of the incident surface and the exit surface on an optical axis in coordinate points on the aspherical surface where a height from the optical axis is h can be represented by Expression 1 (accordingly, the constant B in Expression 1 is B=0 in each of the surfaces R1 and R2). The constants K, A4, A6, A8, A10, A12, A14 and A16 in Expression 1 are set as shown in the following Table 4:

TABLE 4

| | Surface R1 | Surface R2 |
|---|---|---|
| C | 1.303586 | −2.595613 |
| K | −0.68271 | −10.02923 |
| A4 | 0.003329 | 0.0170505 |
| A6 | 0.000669 | −0.001445 |
| A8 | 0.001154 | −0.007093 |
| A10 | −0.0023 | 0.0149578 |
| A12 | 0.003248 | −0.015814 |
| A14 | −0.0021 | 0.0092379 |
| A16 | 0.00059 | −0.00211 |

Figure 6:
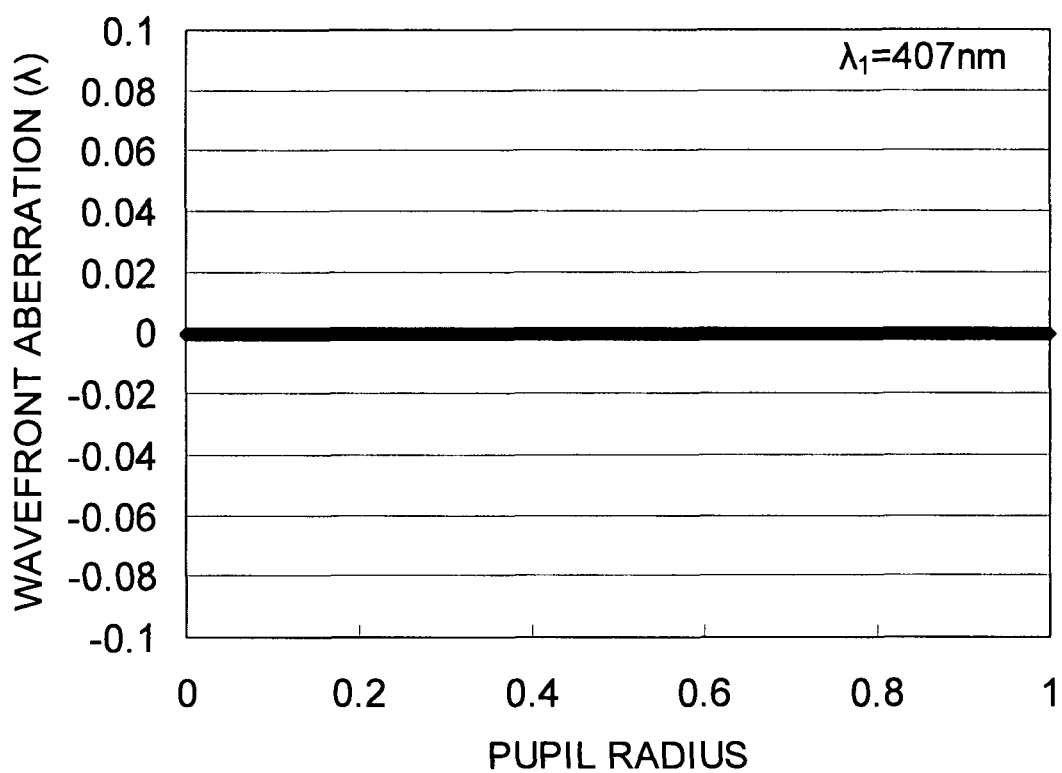
FIG. 6 is a wavefront aberration chart of a light beam with a wavelength of 407 nm which has passed through a coupling lens in an example 1 and an objective lens.
Figure 7:
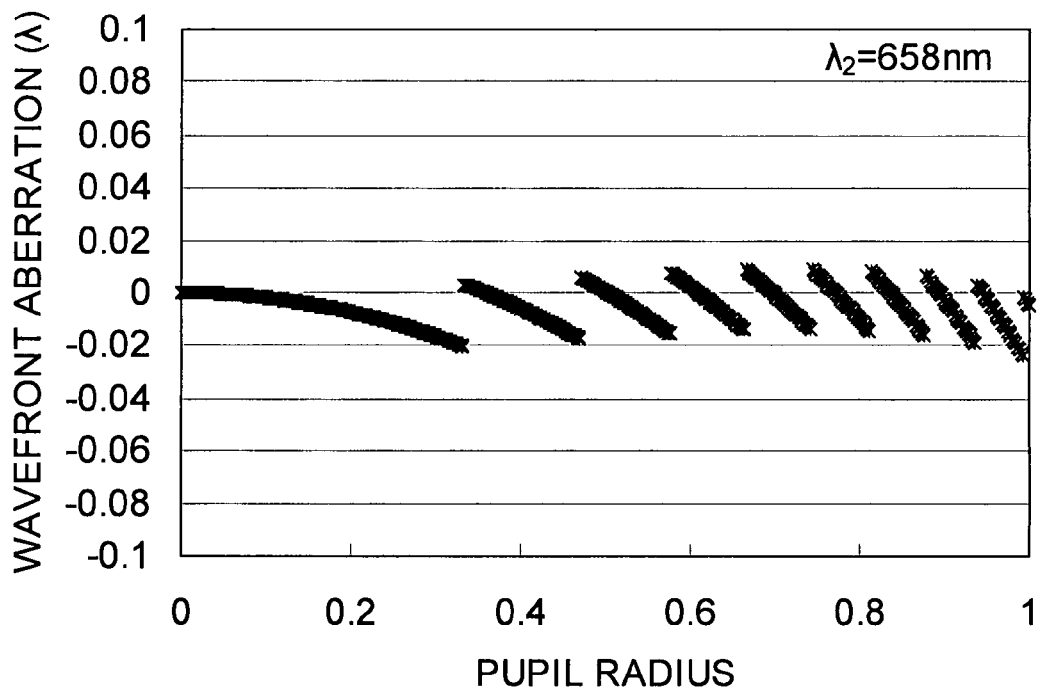
FIG. 7 is a wavefront aberration chart of a light beam with a wavelength of 658 nm which has passed through the coupling lens in the example 1 and an objective lens.
Figure 8:
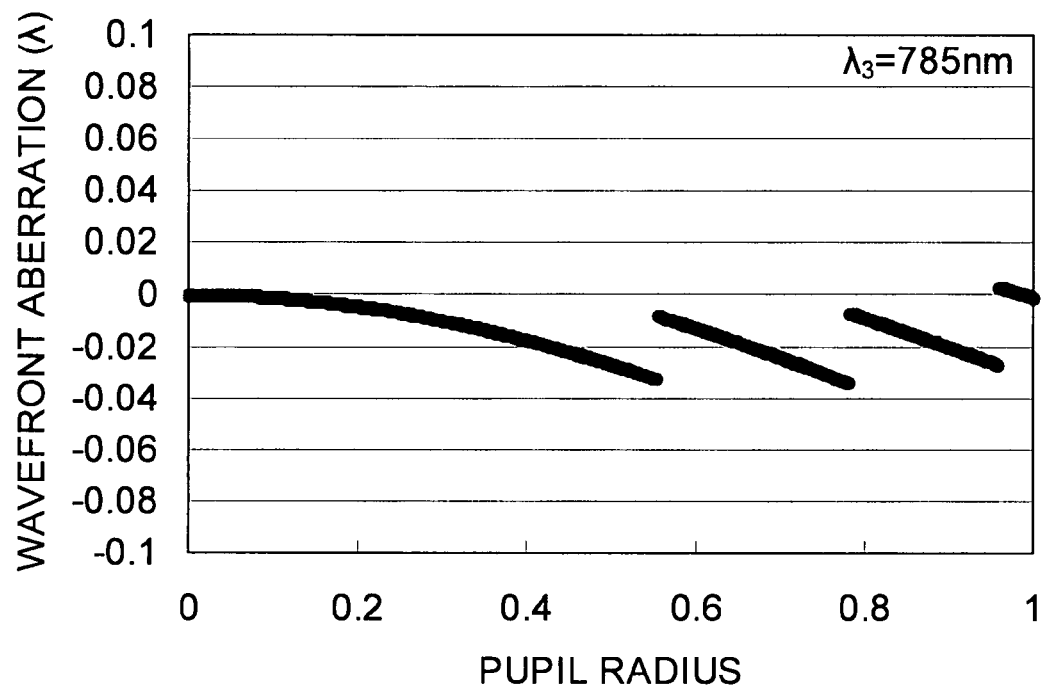
FIG. 8 is a wavefront aberration chart of a light beam with a wavelength of 785 nm which has passed through the coupling lens in the example 1 and an objective lens.

FIGS. 6 to 8 are wavefront aberraton charts of the light beam which is emitted from the light source 10 and has passed through the coupling lens 30 and the objective lens 50. In the charts, the horizontal axis indicates a pupil radius, and the vertical axis indicates wavefront aberration. FIG. 6 shows the case of the wavelength $\lambda_1=407$ nm, FIG. 7 shows the case of the wavelength $\lambda_2=658$ nm, and FIG. 8 shows the case of the wavelength $\lambda_3=785$ nm.

Referring first to FIG. 6, in the case of a blue laser with the wavelength $\lambda_1=407$ nm, wavefront aberration is constant at substantially $0\lambda$. This is because the adjacent step height $d*(n_1-1)$ of the annular zone is just 10 times the wavelength $\lambda_1$.

Referring then to FIG. 7, in the case of the wavelength $\lambda_2=658$ nm, wavefront aberration is a discrete value for each annular zone. This is because the adjacent step height $d*(n_2-1)$ of the annular zone is about 5.98 times the wavelength $\lambda_2$, which is not just 6 times. Still, total wavefront aberration is as small as $0.0070$ $\lambda$rms. In the effective diameter, the region from the center of the coupling lens 30 to the tenth annular zone is used.

Referring then to FIG. 8, in the case of the wavelength $\lambda_3=785$ nm, wavefront aberration is a discrete value for each annular zone, just like the case of the wavelength $\lambda_2=658$ nm. This is because the adjacent step height $d*(n_3-1)$ of the annular zone is about 4.98 times the wavelength $\lambda_3$, which is not just 5 times. Still, total wavefront aberration is as small as $0.0093$ $\lambda$rms. In the effective diameter, the region from the center of the coupling lens 30 to the fourth annular zone is used.

Comparative Example 1

In a comparative example 1, a normal coupling lens which has no annular zone is used. The constants in Expression 1 are set as shown in the following Table 5. As shown in FIG. 5, the surface shape of the light exit surface is different from that in the example 1. The other conditions are the same as those in the example 1.

TABLE 5

| | Incident surface | Exit surface |
|---|---|---|
| B | 0 | 1.5 |
| C | 51.18388 | −9.07895 |
| K | 0 | −1.1035 |
| A4 | 0.0001188 | 4.97888E−05 |
| A6 | 7.30917E−06 | 6.82382E−06 |
| A8 | 7.5616E−07 | 5.91868E−07 |

TABLE 5-continued

|  | Incident surface | Exit surface |
|---|---|---|
| A10 | 0 | 1.42434E−08 |
| A12 | 0 | 1.8572E−10 |

Figure 9:
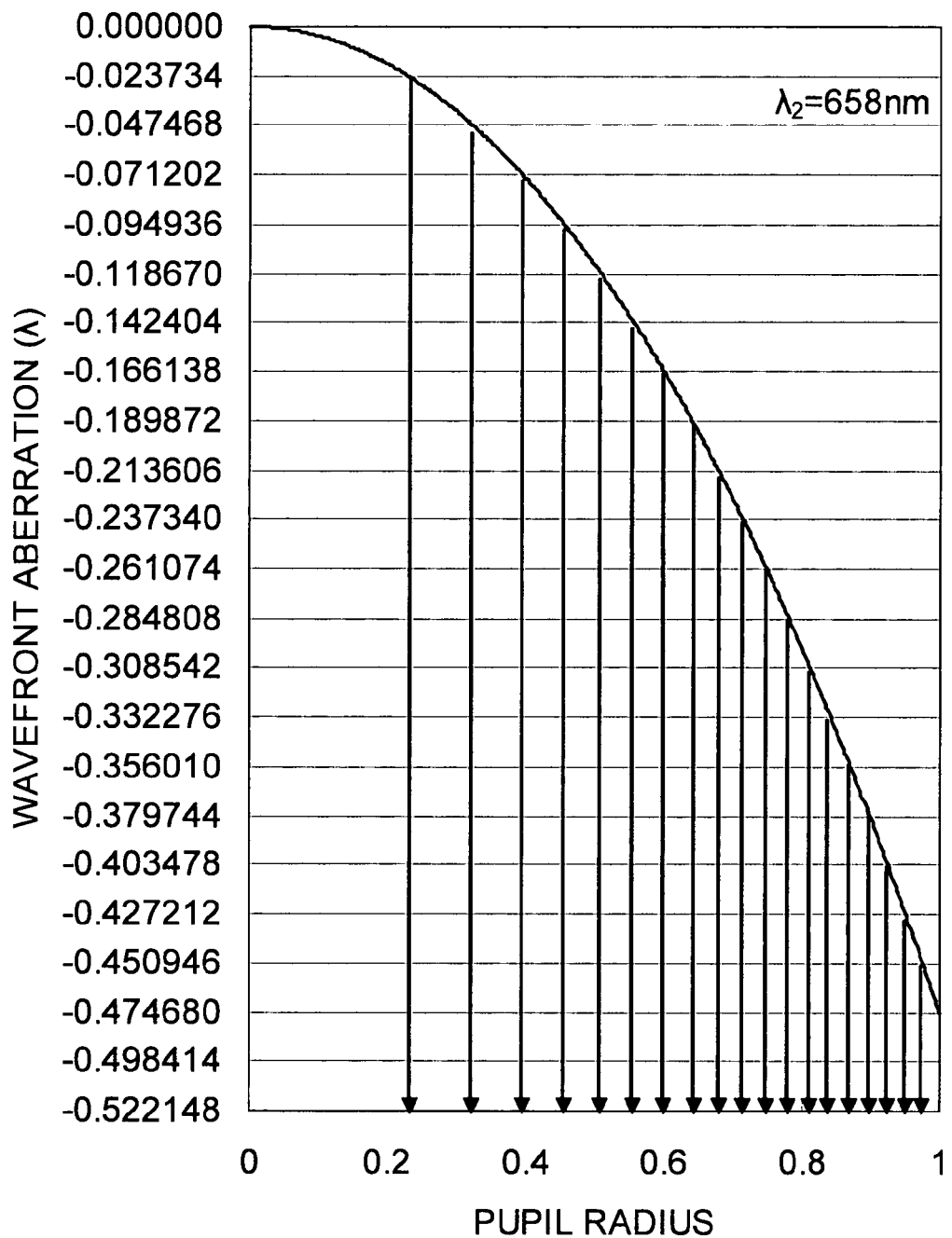
FIG. 9 is a wavefront aberration chart of a light beam with a wavelength of 658 nm which has passed through a coupling lens in a comparative example 1.

FIG. 9 is a wavefront aberration chart of the light beam which is emitted from the light source 10 and converted into substantially parallel light by the coupling lens 30 of the comparative example 1. In the charts, the horizontal axis indicates a pupil radius, and the vertical axis indicates wavefront aberration. FIG. 9 shows the case of the wavelength $\pi_2$=658 nm as a typical case.

Because the coupling lens of the comparative example 1 does not have annular zones, wavefront aberration is consecutive values. A maximum value of the wavefront aberration is about 0.48λ, which is significantly larger than the value of the example 1. Further, based on the data of the coupling lens of the comparative example 1 at the wavelength $\lambda_2$=658 nm, the width of the annular zone on the coupling lens of the example 1 is determined so that the wavefront aberration at each annular zone is 0.023734 at maximum. Specifically, the position where a step between annular zones is formed is indicated by the arrow in FIG. 9. The width of the annular zone is preferably determined so that the wavefront aberration at each annular zone is 0.035λ or smaller for all of the above three wavelengths.

The following Tables 6 to 8 show wavefront aberration and chromatic aberration of the light beam which is emitted from the light source 10 and has passed through the coupling lens 30 and the objective lens 50 in the example 1 and the comparative example 1. Table 6 shows the case of the wavelength $\lambda_1$=407 nm, Table 7 shows the case of the wavelength $\lambda_2$=658 nm, and Table 8 shows the case of the wavelength $\lambda_3$=785 nm. As for the wavefront aberration, in addition to total wavefront aberration, SA3 which is the third-order component of spherical aberration and SA5 which is the fifth-order component of spherical aberration are shown by reference. As for the chromatic aberration, Table 6 shows focus position shifts or chromatic aberration when a wavelength shifts by ±1 nm from a reference wavelength of 407 nm, and an average of those values. Tables 7 and 8 show chromatic aberration when a wavelength shifts by ±3 nm from each reference wavelength of 658 nm and 785 nm and an average of those values per 1 nm.

TABLE 6

| | | Wavelength $\lambda_1$ = 407 nm | |
|---|---|---|---|
| | | Comparative example 1 | Example 1 |
| Wavefront aberration (λ) | total | 0.0000 | 0.0001 |
| | SA3 | 0.0000 | 0.0000 |
| | SA5 | 0.0000 | 0.0000 |
| Chromatic aberration (μm) | −1 nm | −0.500 | −0.072 |
| | +1 nm | 0.496 | 0.066 |
| | Ave. | 0.498 | 0.069 |

TABLE 7

| | | Wavelength $\lambda_2$ = 658 nm | |
|---|---|---|---|
| | | Comparative example 1 | Example 1 |
| Wavefront aberration (λ) | total | 0.0017 | 0.0070 |
| | SA3 | −0.0005 | −0.0022 |
| | SA5 | 0.0000 | −0.0006 |
| Chromatic aberration (μm) | −3 nm | −0.334 | 0.363 |
| | +3 nm | 0.361 | −0.372 |
| | Ave. | 0.116 | 0.122 |

TABLE 8

| | | Wavelength $\lambda_3$ = 785 nm | |
|---|---|---|---|
| | | Comparative example 1 | Example 1 |
| Wavefront aberration (λ) | total | 0.0021 | 0.0093 |
| | SA3 | 0.0021 | 0.0053 |
| | SA5 | 0.0000 | −0.0004 |
| Chromatic aberration (μm) | −3 nm | −0.205 | 0.156 |
| | +3 nm | 0.200 | −0.163 |
| | Ave. | 0.068 | 0.053 |

Referring first to Table 6, in the case of the wavelength $\lambda_1$=407 nm, while the wavefront aberration in the comparative example 1 is 0.0000 λrms, the wavefront aberration in the example 1 is 0.0001 λrms, which is a very good value. Further, while the average of the chromatic aberration in the comparative example 1 is 0.498 μm/nm, which is too large, the average of the chromatic aberration in the example 1 is 0.069 μm/nm, which decreases by one digit and thus improves to a very good value.

Referring then to Table 7, in the case of the wavelength $\lambda_1$=658 nm, while the wavefront aberration in the comparative example 1 is 0.0017 λrms, the wavefront aberration in the example 1 is 0.0070 λrms, which is slightly larger but still a very good value. Further, while the average of the chromatic aberration in the comparative example 1 is 0.116 μm/nm, the average of the chromatic aberration in the example 1 is 0.122 μm/nm, which is substantially equal and a very good value.

Referring further to Table 8, in the case of the wavelength $\lambda_1$=785 nm, while the wavefront aberration in the comparative example 1 is 0.0021 λrms, the wavefront aberration in the example 1 is 0.0093 λrms, which is slightly larger but still a very good value. Further, while the average of the chromatic aberration in the comparative example 1 is 0.068 μm/nm, the average of the chromatic aberration in the example 1 is 0.053 μm/nm, which is a little smaller and a very good value.

Figure 10:
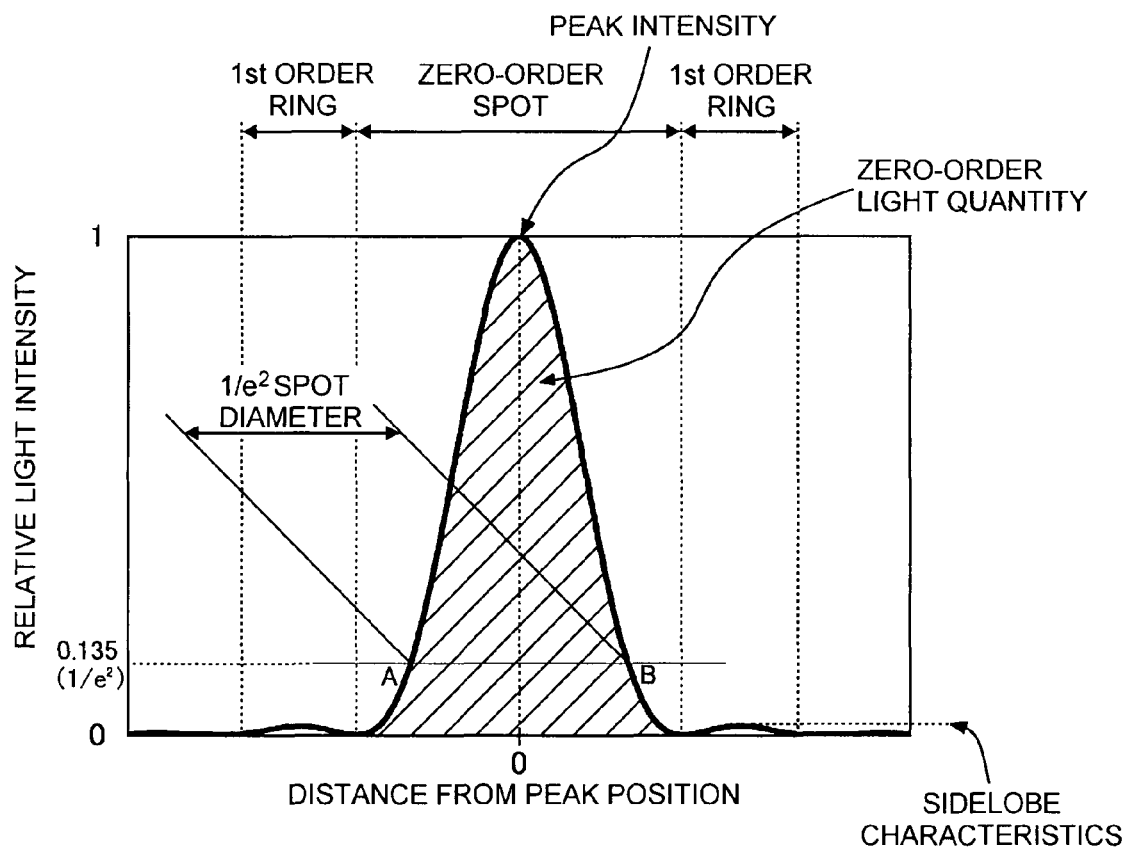
FIG. 10 is a view schematically showing a beam profile.

Referring now to FIG. 10, the beam profile of the optical spot of the light beam which is emitted from the light source 10, is converted by the coupling lens 30, passes through the objective lens 50 and is then focused on the optical disc 60.

The optical spot has the beam profile as shown in FIG. 10. The horizontal axis indicates a position, and the vertical axis indicates a light intensity. The light intensity in the vertical axis is standardized so that a peak intensity is 1. As shown in FIG. 10, the light intensity decreases as a distance from the peak increases, and the light intensity reaches a minimum, where it is substantially 0, at a certain position. When a distance from the peak further increases from the minimum, the light intensity of a high order term, which is called sidelobe, exists. The region between the minimum and the minimum including the peak is called a zero-order spot. The sidelobe region which exists outside the zero-order spot is called a first-order ring.

The optical spot characteristics are defined by three parameters. A first parameter is a $1/e^2$ spot diameter (e is Napier's constant ($\approx 2.71828$)) which indicates the size of the optical spot. A distance between two points AB having the light intensity of $1/e^2$ ($\approx 13.5\%$) of the peak intensity of the optical spot is the spot diameter of the optical spot. The $1/e^2$ spot diameter is represented as $D=0.82*\lambda/NA$ (where NA is a numerical aperture, and $\lambda$ is a wavelength of light). Accordingly, the spot diameter is proportional to a wavelength and inversely proportional to NA. As the $1/e^2$ spot diameter is smaller, the area where light is applied on an information recording surface of an optical disc is smaller, which enables the obtainment of a suitable resolution.

A second parameter is sidelobe characteristics, which is a ratio of the light intensity at the peak in the zero-order spot with respect to the light intensity at the peak in the first-order ring. The optical spot with a smaller sidelobe is a better optical spot. When light is focused on an optical disc, the light which is reflected by the optical disc at the position of the first-order ring is mixed as a noise into a signal which is obtained by being reflected by an information recording surface of the optical disc. Thus, the optical spot with a larger sidelobe generates a signal with a greater noise. Accordingly, an optical spot having smaller sidelobe characteristics is considered as a better optical spot.

A third parameter is a zero-order light quantity, which is a total light quantity in the zero-order spot. The zero-order light quantity corresponds to the light intensity of the relevant optical spot. As the optical spot has a larger zero-order light quantity, the signal intensity which is generated when light is applied to an optical disc becomes higher. Accordingly, the use of the optical spot with a larger zero-order light quantity enables the obtainment of a suitable signal with a high S/N (signal-to-noise) ratio.

The following Tables 9 to 11 show the above-described three spot characteristics in the example 1 and the comparative example 1. Table 9 shows the case of the wavelength $\lambda_1=407$ nm, Table 10 shows the case of the wavelength $\lambda_2=658$ nm, and Table 11 shows the case of the wavelength $\lambda_3=785$ nm. As for the $1/e^2$ spot diameter, a spot diameter Dx in the direction x and a spot diameter Dy in the direction y of an optical spot which is formed on the plane xy are shown. As for the sidelobe characteristics, a sidelobe SLx in the direction x and a sidelobe SLy in the direction y, and a maximum value SLmax of an optical spot which is formed on the plane xy are shown.

TABLE 9

| | | Wavelength $\lambda_1$ = 407 nm | |
|---|---|---|---|
| | | Comparative example 1 | Example 1 |
| $1/e^2$ spot diameter (μm) | Dx | 0.513 | 0.513 |
| | Dy | 0.513 | 0.513 |
| Sidelobe (%) | SLx | 1.8 | 1.7 |
| | SLy | 1.8 | 1.7 |
| | SLmax. | 1.8 | 1.7 |
| Zero-order light quantity (%) | | 83.8 | 83.9 |

TABLE 10

| | | Wavelength $\lambda_2$ = 658 nm | |
|---|---|---|---|
| | | Comparative example 1 | Example 1 |
| $1/e^2$ spot diameter (μm) | Dx | 0.830 | 0.830 |
| | Dy | 0.830 | 0.830 |
| Sidelobe (%) | SLx | 1.8 | 1.7 |
| | SLy | 1.8 | 1.7 |
| | SLmax. | 1.8 | 1.7 |
| Zero-order light quantity (%) | | 83.8 | 83.7 |

TABLE 11

| | | Wavelength $\lambda_3$ = 785 nm | |
|---|---|---|---|
| | | Comparative example 1 | Example 1 |
| $1/e^2$ spot diameter (μm) | Dx | 1.287 | 1.289 |
| | Dy | 1.287 | 1.289 |
| Sidelobe (%) | SLx | 1.8 | 1.8 |
| | SLy | 1.8 | 1.8 |
| | SLmax. | 1.8 | 1.8 |
| Zero-order light quantity (%) | | 83.8 | 83.5 |

Referring first to Table 9, in the case of the wavelength $\lambda_1=407$ nm, the $1/e^2$ spot diameter of the example 1 is 0.513 μm for both Dx and Dy, and the $1/e^2$ spot diameter of the comparative example 1 is also 0.513 μm for both Dx and Dy, which are exactly the same. Further, while the maximum value SLmax of the sidelobe of the comparative example 1 is 1.8%, SLmax of the example 1 is 1.7%, which improves by 0.1%. Furthermore, while the zero-order light quantity of the comparative example 1 is 83.8%, the zero-order light quantity of the example 1 is 83.9%, which is slightly better. Thus, the optical spot characteristics of the example 1 at the wavelength $\lambda_1=407$ nm are substantially equal to those of the comparative example 1.

Referring then to Table 10, in the case of the wavelength $\lambda_1=658$ nm, the $1/e^2$ spot diameter of the example 1 is 0.830 μm for both Dx and Dy, and the $1/e^2$ spot diameter of the comparative example 1 is also 0.830 μm for both Dx and Dy, which are exactly the same. Further, while the maximum value SLmax of the sidelobe of the comparative example 1 is 1.8%, SLmax of the example 1 is 1.7%, which improves by 0.1%. Furthermore, while the zero-order light quantity of the comparative example 1 is 83.8%, the zero-order light quantity of the example 1 is 83.7%, which are substantially equal. Thus, the optical spot characteristics of the example 1 at the wavelength $\lambda_1=658$ nm are substantially equal to those of the comparative example 1.

Referring further to Table 11, in the case of the wavelength $\lambda_1=785$ nm, while the $1/e^2$ spot diameter of the example 1 is 1.287 μm for both Dx and Dy, the $1/e^2$ spot diameter of the comparative example 1 is 1.289 μm for both Dx and Dy, which are substantially equal. Further, the maximum value SLmax of the sidelobe of the comparative example 1 is 1.8%, and SLmax of the example 1 is also 1.8%, which are exactly the same. Furthermore, while the zero-order light quantity of the comparative example 1 is 83.8%, the zero-order light quantity of the example 1 is 83.5%, which are substantially equal. Thus, the optical spot characteristics of the example 1 at the wavelength $\lambda_1=785$ nm are substantially equal to those of the comparative example 1.

As described in the foregoing, the use of the coupling lens according to the present invention significantly improves the chromatic aberration at the wavelength $\lambda_1=407$ nm while maintaining suitable wavefront aberration characteristics and optical spot characteristics for the above three wavelengths compared with the comparative example 1. It is thereby possible to provide a coupling lens for chromatic aberration correction which has high light use efficiency and which can be used with two or more wavelengths.

Second Embodiment

When the adjacent step height d is set to a fixed value by placing a high priority on the chromatic aberration correction for an HD-DVD laser as in the first embodiment, incident light onto an objective lens is finite at a CD laser wavelength. Thus, coma aberration which occurs when an objective lens shifts during tracking becomes a problem.

In light of this, a coupling lens for chromatic aberration correction according to a second embodiment of the present invention makes fine adjustments of the adjacent step height in a region which is used only when an objective lens shifts at a CD laser wavelength. The other structure is the same as that of the first embodiment and thus not described in detail herein.

This structure reduces wavefront aberration in each annular zone of the region and thereby reduces a total value of wavefront aberration. This embodiment places a greater importance on the objective lens shift characteristics at a CD laser wavelength because placing a high priority on the chromatic aberration correction at an HD-DVD laser causes incident light onto an objective lens to be finite in an optical system at a CD laser wavelength, resulting in the degradation of the objective lens shift characteristic. However, the present invention may be applied for any wavelength, not only for a CD laser wavelength, as long as incident light onto an objective lens is finite.

Example 2

In the coupling lens 30 for chromatic aberration correction according to an example 2, the light exit surface shown in FIG. 1B is sectioned into 20 annular zones from the optical axis in the radius direction, and the surface shape of each zone is designed so as to reduce the chromatic aberration of a blue-violet semiconductor laser. Specifically, for the light exit surface and the light incident surface shown in FIG. 1B, the constants B, K, A4, A6, A8, A10 and A12 in Expression 1 are set as shown in the following Tables 12 and 13. In all the annular zones of the light exit surface and the incident surface, $A14=A16=0$.

TABLE 12

|  | zone | h(inside) (mm) | h(outside) (mm) | B | C | K |
|---|---|---|---|---|---|---|
| Incident surface | — | 0 | 2 | 0 | 51.18388 | 0 |
| Exit surface | 1 | 0 | 0.434072 | 1.5 | −9.078946 | −1.0957186 |
|  | 2 | 0.434072 | 0.613136 | 1.5080393 | −9.081649 | −1.1028383 |
|  | 3 | 0.613136 | 0.750057 | 1.516078599 | −9.084353 | −1.1019999 |
|  | 4 | 0.750057 | 0.865074 | 1.524117899 | −9.087053 | −1.1058027 |
|  | 5 | 0.865074 | 0.966051 | 1.532207199 | −9.089751 | −1.1024311 |
|  | 6 | 0.966051 | 1.057027 | 1.540306499 | −9.09246 | −1.1012829 |
|  | 7 | 1.057027 | 1.140401 | 1.548235798 | −9.095152 | −1.1053145 |
|  | 8 | 1.140401 | 1.217742 | 1.556275098 | −9.097856 | −1.1001369 |
|  | 9 | 1.217742 | 1.290134 | 1.564314398 | −9.100562 | −1.1035769 |
|  | 10 | 1.290134 | 1.358375 | 1.572353698 | −9.103257 | −1.1018831 |
|  | 11 | 1.358375 | 1.42307 | 1.580392997 | −9.105968 | −1.1093129 |
|  | 12 | 1.42307 | 1.484677 | 1.588432297 | −9.108662 | −1.1068974 |
|  | 13 | 1.484677 | 1.543577 | 1.596471597 | −9.111373 | −1.0980311 |
|  | 14 | 1.543577 | 1.600068 | 1.604510897 | −9.114078 | −1.0986869 |
|  | 15 | 1.600068 | 1.654402 | 1.612550196 | −9.116768 | −1.0995001 |
|  | 16 | 1.654402 | 1.706787 | 1.620589496 | −9.11948 | −1.0942672 |
|  | 17 | 1.706787 | 1.757397 | 1.628628796 | −9.1222 | −1.0740908 |
|  | 18 | 1.757397 | 1.806385 | 1.636668095 | −9.124881 | −1.0999588 |
|  | 19 | 1.806385 | 1.853881 | 1.644707395 | −9.127565 | −1.0938974 |
|  | 20 | 1.853881 | 2 | 1.652746695 | −9.13028 | −1.0955512 |

TABLE 13

|  | zone | A4 | A6 | A8 | A10 | A12 |
|---|---|---|---|---|---|---|
| Incident surface | 1 | 0.000118783 | 7.30917E−06 | 7.5616E−07 | 0 | 0 |
| Exit surface | 1 | 5.11246E−05 | 6.76945E−06 | 6.2091E−07 | 7.3045E−09 | 7.93E−10 |
|  | 2 | 4.97957E−05 | 6.82164E−06 | 5.8584E−07 | 1.53517E−08 | 8.07E−11 |
|  | 3 | 4.98204E−05 | 6.8323E−06 | 5.7415E−07 | 1.75617E−08 | −1.035E−10 |
|  | 4 | 4.91226E−05 | 6.79432E−06 | 5.8531E−07 | 1.48171E−08 | 1.204E−10 |
|  | 5 | 4.9655E−05 | 6.72114E−06 | 6.1188E−07 | 8.7533E−09 | 6.162E−10 |
|  | 6 | 4.96476E−05 | 6.81341E−06 | 5.6271E−07 | 1.90808E−08 | −2.354E−10 |
|  | 7 | 4.9036E−05 | 6.65617E−06 | 6.288E−07 | 4.4356E−09 | 9.677E−10 |
|  | 8 | 4.97762E−05 | 6.67103E−06 | 6.1492E−07 | 7.1089E−09 | 7.467E−10 |
|  | 9 | 4.90582E−05 | 6.71517E−06 | 5.882E−07 | 1.25964E−08 | 2.916E−10 |
|  | 10 | 4.93455E−05 | 6.60761E−06 | 6.3109E−07 | 2.9568E−09 | 1.0847E−09 |
|  | 11 | 4.7897E−05 | 6.72274E−06 | 5.7211E−07 | 1.54422E−08 | 5.34E−11 |
|  | 12 | 4.83215E−05 | 6.59971E−06 | 6.2157E−07 | 4.4643E−09 | 9.509E−10 |

TABLE 13-continued

| zone | A4 | A6 | A8 | A10 | A12 |
|------|------------|------------|------------|-------------|-------------|
| 13 | 4.95659E−05 | 6.71374E−06 | 5.6196E−07 | 1.70219E−08 | −8.18E−11 |
| 14 | 4.93289E−05 | 6.73868E−06 | 5.4421E−07 | 2.05135E−08 | −3.686E−10 |
| 15 | 4.92803E−05 | 6.55708E−06 | 6.2065E−07 | 3.7482E−09 | 1.0014E−09 |
| 16 | 4.99046E−05 | 6.6875E−06 | 5.542E−07 | 1.77425E−08 | −1.463E−10 |
| 17 | 5.2874E−05 | 6.92774E−06 | 4.36E−07 | 4.29738E−08 | −2.22E−09 |
| 18 | 4.8835E−05 | 6.61853E−06 | 5.7334E−07 | 1.29826E−08 | 2.402E−10 |
| 19 | 5.00095E−05 | 6.34347E−06 | 6.9313E−07 | −1.3328E−08 | 2.406E−09 |
| 20 | 4.94472E−05 | 6.52822E−06 | 6.0172E−07 | 6.1817E−09 | 7.975E−10 |

The objective lens 50 is the same as that of the example 1. Either surface of the objective lens 50 has two regions, an inside region which at least includes an optical axis and an outside region which is placed outside of the inside region. The inside region is a common use area for focusing all of an HD-DVD laser, a DVD laser and a CD laser. The outside region is a common use area for focusing an HD-DVD laser and a DVD laser. The objective lens 50 may be a refraction lens as disclosed in Japanese Unexamined Patent Application Publication No. 2003-270528, a diffraction lens as disclosed in Japanese Unexamined Patent Application Publication No. 2000-81566, or a lens of another type. In the example 2, a refraction lens is used as in the example 1.

In the example 2, each region has no step for simplification. However, if each region is sectioned into a plurality of zones from an optical axis in the radius direction and each zone has an aspherical shape which cancels out the chromatic aberration due to a difference in the laser wavelength λ and the wavefront aberration due to a difference in the thickness of a transparent substrate of an optical recording medium, the optical performance improves.

FIG. 2 shows the case where the light source 10 emits light with a wavelength of 407 nm for HD-DVD in the example 2. The divergent light which is emitted from the light source 10 passes through the half mirror 20 and enters the coupling lens 30 for chromatic aberration correction where it is converted into substantially parallel light to become infinite light. The parallel light then passes through the aperture stop 40 and enters the objective lens 50. The light which has passed through the objective lens 50 is focused on the optical disc 60 by the objective lens 50. An image-side NA is about 0.65.

Figure 11:
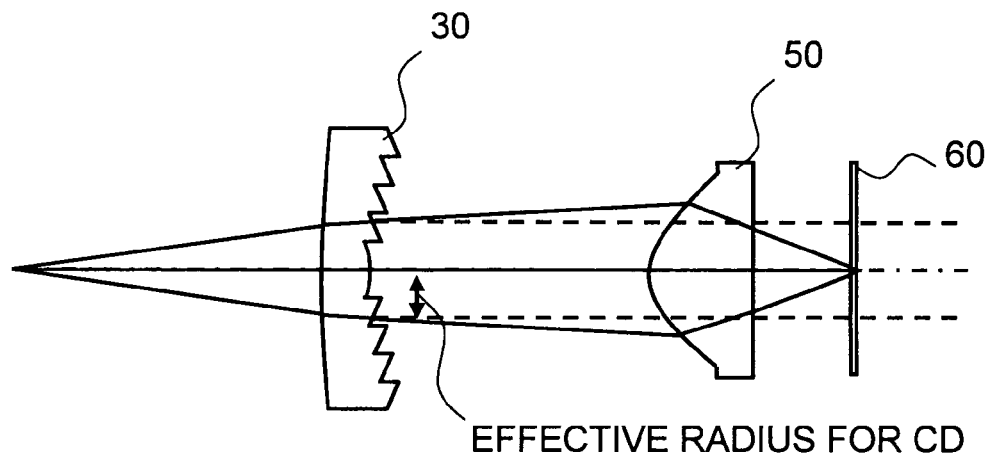
FIG. 11 is a schematic view showing an optical system of an optical pickup device according to the second embodiment.

FIG. 11 shows the case where the light source 10 emits light with a wavelength of 785 nm for CD. Like the case of HD-DVD shown in FIG. 2, the light which is emitted from the light source 10 is divergent light. On the other hand, because of the compatibility among three wavelengths, the light which has passed through the coupling lens 30 for chromatic aberration correction becomes sub-divergent light, which is finite light, in the case of a CD laser. An image-side NA is about 0.5.

Figure 12:
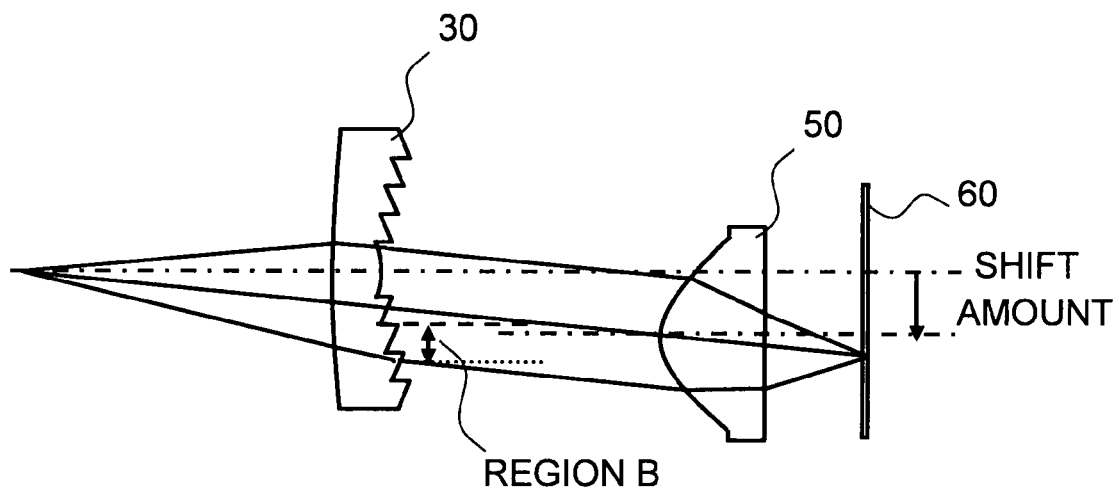
FIG. 12 is a schematic view showing an optical system of an optical pickup device according to the second embodiment when an objective lens shifts.

FIG. 12 shows the case where the objective lens 50 shifts in the optical system for a CD laser shown in FIG. 11. As a result of the lens shift, the use area of the coupling lens 30 for chromatic aberration correction increases. Thus, a region which is used when the objective lens shifts, that is, a region B which is used only during the objective lens shift, exists outside the effective radius for CD. Specifically, the annular zones 5 and 6 shown in Table 12 belong to the region B which is used only when the objective lens shifts in the example 2.

Figure 13:
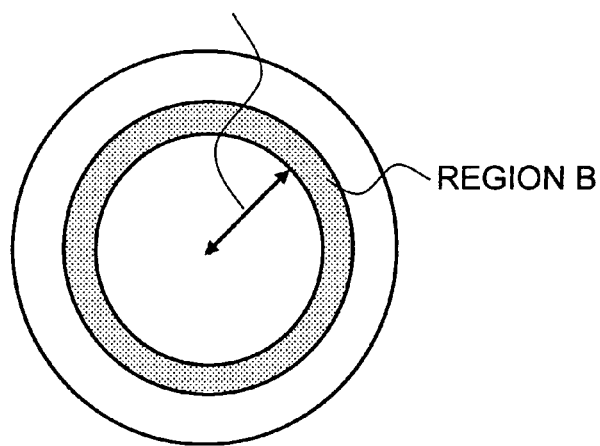
FIG. 13 is a schematic plan view showing a region B which is used only when an objective lens shifts in a coupling lens according to the second embodiment.

FIG. 13 shows the coupling lens 30 for chromatic aberration correction when viewed perpendicularly to the optical axis, and it illustrates the region B which is used only when the objective lens shift occurs. By setting different values to an adjacent step height d in the region B and an adjacent step height d within the effective radius A for CD, the lens shift characteristics improve. Specifically, because the annular zones 5 and 6 belong to the region B which is used only during the objective lens shift in the example 2, an adjacent step height between the annular zones 4 and 5 and an adjacent step height between the annular zones 5 and 6 are set larger than an adjacent step height within the effective radius A for CD.

More specifically, at a CD laser wavelength $\lambda_3$ in which the light beam that is output from the coupling lens is finite light, when the height of a step which is formed within the effective radius A is $d_A = m_{3A} \lambda_3/(n_3-1)$ where $m_{3A}$ is an actual number and $n_3$ is a refractive index at the wavelength $\lambda_3$, and the height of a step which is formed in the region B through which a light beam passes only when the objective lens shifts is $d_B = m_{3B} \lambda_3/(n_3-1)$, the relationship of $m_{3B} > m_{3A}$ is satisfied. It is thereby possible to reduce the coma aberration which occurs when the objective lens shifts.

In the example 2, a reference adjacent step height is determined so that it is just an integral multiple of $\lambda_1$ by placing a high priority on the chromatic aberration correction at $\lambda_1 = 407$ nm of an HD-DVD laser. Specifically, the adjacent step height $d_A$ is set to $d_A = 10.00 * \lambda_1/(n_1-1) = 4.98 * \lambda_3/(n_3-1) = 8.0393$ μm. Because $m_1 = 10.00$ and $m_{3A} = 4.98$, the adjacent step height $d_B$ between the annular zones 4 and 5 is set to $d_B = 10.06 * \lambda_1/(n_1-1) = 5.01 * \lambda_3/(n_3-1) = 8.0893$ μm (where $4.98 = m_{3A} < m_{3B} = 5.01$), so that it is larger than the reference adjacent step height or the adjacent step height $d_A$ within the effective radius A for CD by 0.05 μm. Further, the adjacent step height $d_B$ between the annular zones 5 and 6 is set to $d_B = 10.08 * \lambda_1/(n_1-1) = 5.02 * \lambda_3/(n_3-1) = 8.0993$ μm (where $4.98 = m_{3A} < m_{3B} = 5.02$), so that it is larger than the reference adjacent step height or the adjacent step height $d_A$ within the effective radius A for CD by 0.06 μm. The following Table 14 shows the adjacent step height d in the effective radius A and the region B, and $m_1$, $m_2$, $m_3$ and $\Delta m_3 = m_{3A} - m_{3B}$ corresponding to each region.

TABLE 14

| | Adjacent step height (μm) | $m_1$ | $m_2$ | $m_3$ | $\Delta m_3$ ($=m_{3B} - m_{3A}$) | zone |
|---|---|---|---|---|---|---|
| Region A | 8.0393 | 10.00 | 5.98 | 4.98 | — | 1-5 |
| Region B-1 | 8.0893 | 10.06 | 6.01 | 5.01 | 0.03 | 4-5 |
| Region B-2 | 8.0993 | 10.08 | 6.02 | 5.02 | 0.04 | 5-6 |

In order to maintain suitable chromatic aberration at $\lambda_1 = 407$ nm, it is preferred that $d_A < d_B \leq 10.1 * \lambda_1/(n_1-1)$. Further, the adjacent step height between the annular zones 6 and 7 is set to 7.9293 μm, so that it is smaller than the reference adjacent step height by 0.11 μm, which is a total increase amount of the above two adjacent step heights. It is thereby possible to maintain suitable chromatic aberration at $\lambda_1$=407 nm.

Comparative Example 2

A comparative example 2 corresponds to the above-described example 1. Thus, the adjacent step height d in every annular zone of the coupling lens for chromatic aberration correction is set to a fixed value. Thus, a difference from the example 2 is only each constant B in Expression 1 which defines the coupling lens for chromatic aberration correction.

Figure 14:
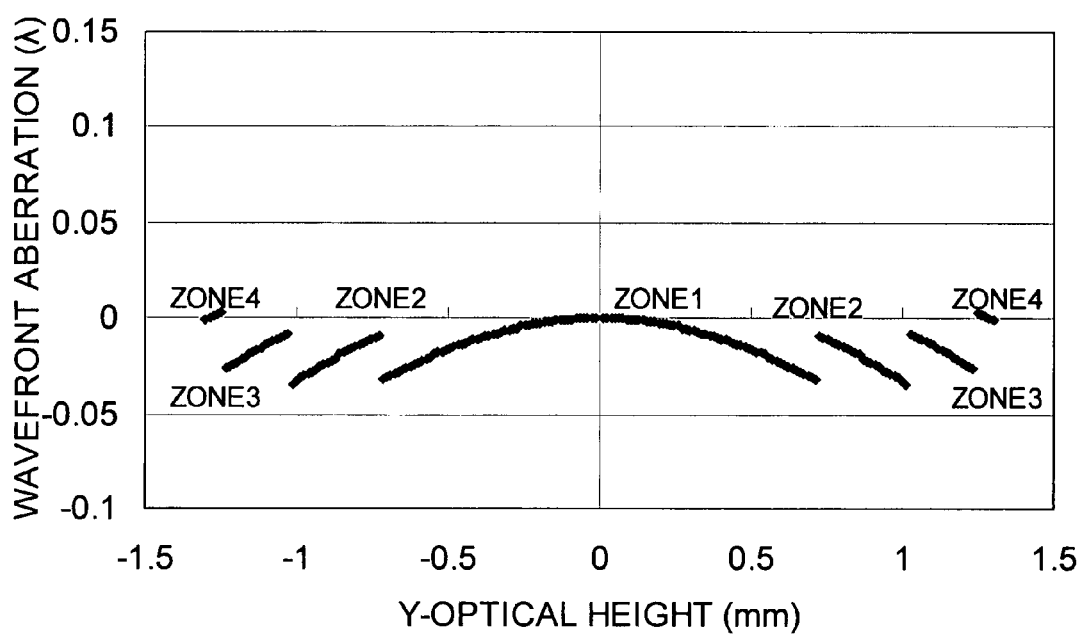
FIG. 14 is a wavefront aberration chart in an optical system where the optical axes of a coupling lens and an objective lens correspond to each other in an example 2 and a comparative example 2.

FIG. 14 is a wavefront aberration chart at a CD laser with a wavelength of 785 nm in an optical system where the optical axes of a coupling lens for chromatic aberration correction and an objective lens correspond to each other in the example 2 and the comparative example 2. The horizontal axis indicates an optical path height, and the vertical axis indicates wavefront aberration. The chart tells that the use area of the coupling lens for chromatic aberration correction is the annular zones 1 to 4, total wavefront aberration is about 0.009 $\lambda$rms, and chromatic aberration is about −0.05 μm/nm. In the coupling lens for chromatic aberration correction in the example 2 and the comparative example 2, the annular zones 1 to 4 have the same structure.

Figure 15:
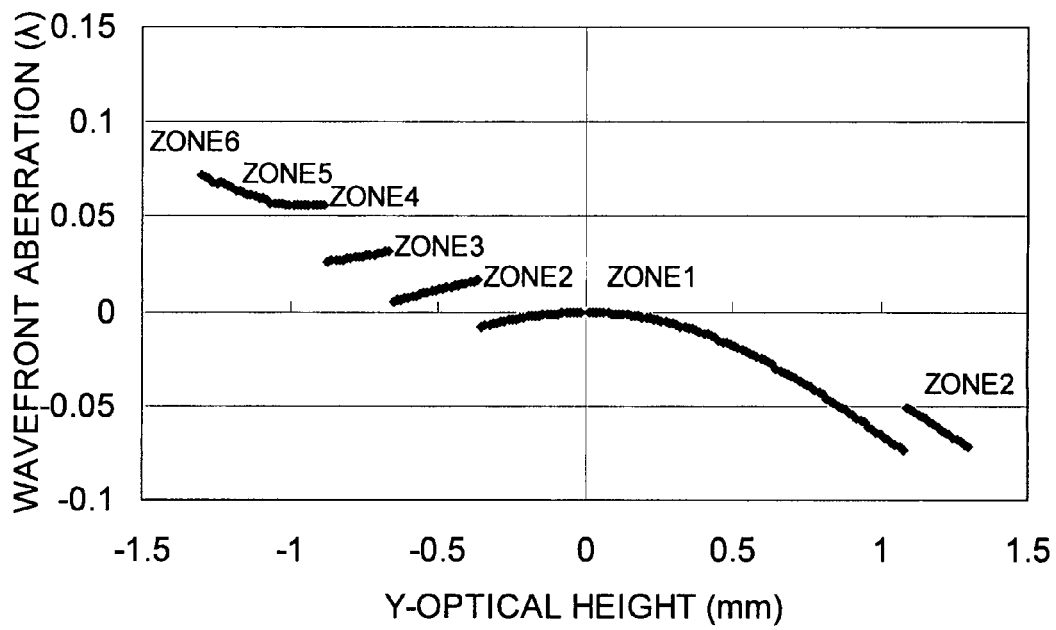
FIG. 15 is a wavefront aberration chart in an optical system when an objective lens shifts in the example 2.

FIG. 15 is a wavefront aberration chart when the objective lens shifts by 0.3 mm with respect to the optical axis of the coupling lens for chromatic aberration correction in the example 2. At a laser of 785 nm, the light that has passed through the coupling lens for chromatic aberration correction, which is the incident light onto the objective lens, is sub-divergent light. Therefore, as a result of the shift of the objective lens, the use area of the coupling lens for chromatic aberration correction becomes the annular zones 1 to 6. The region B which is used only when the objective lens shifts by 0.3 mm with the use of a CD laser corresponds to the annular zones 5 and 6 of the coupling lens for chromatic aberration correction. In the example 2, the adjacent step height between the annular zones 4 and 5 of the coupling lens for chromatic aberration correction is set larger than the adjacent step height within the effective radius A by 0.05 μm, and the adjacent step height between the annular zones 5 and 6 is set larger than the adjacent step height within the effective radius A by 0.06 μm. Thus, the two adjacent step heights in the region B are set larger than the adjacent step height within the effective radius A by 0.11 μm in total. Consequently, the total wavefront aberration is about 0.010 $\lambda$rms.

Figure 16:
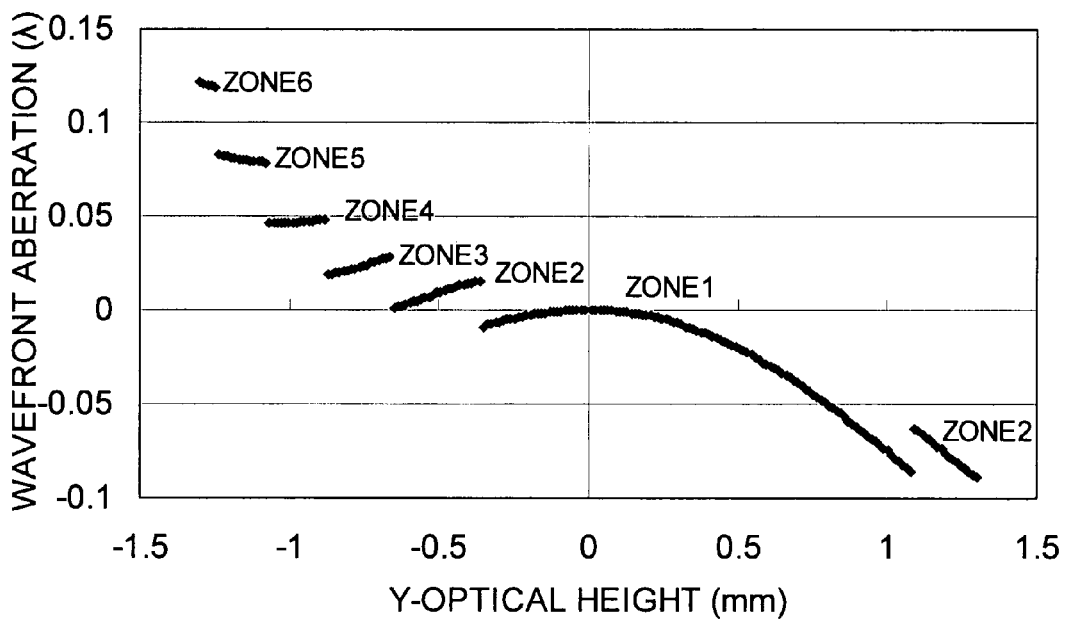
FIG. 16 is a wavefront aberration chart in an optical system when an objective lens shifts in the comparative example 2.

FIG. 16 is a wavefront aberration chart when the objective lens shifts by 0.3 mm with respect to the optical axis of the coupling lens for chromatic aberration correction in the comparative example 2. Like the example 2, the annular zones 1 to 6 of the coupling lens for chromatic aberration correction are used. In the comparative example 2, all of the adjacent step heights in the coupling lens for chromatic aberration correction are the same. The total wavefront aberration is about 0.015 $\lambda$rms.

As described above, the example 2 provides an improved design for the annular zones 5 and 6 in the region B which is used only when the objective lens shifts by 0.3 mm outward from the effective diameter with the use of a CD laser. Comparing FIGS. 15 and 16, wavefront aberration is smaller in the example 2 than in the comparative example 2 by about 0.1$\lambda$ in the annular zone 6 and also smaller in the annular zone 5. Further, the wavefront aberration in the annular zones 4 to 6 are substantially consecutive. Consequently, the total wavefront aberration is about 0.010 $\lambda$rms, which is smaller than that of the comparative example 2 by as large as about 5 m$\lambda$rms.

The following Table 15 shows chromatic aberration in the example 2 and the comparative example 2. The chromatic aberration is a focus position shift (μm) with a change in wavelength by 1 nm. The chromatic aberration at the wavelengths 785 nm and 658 nm in the example 2 is about −0.05 μm/nm and −0.12 μm/nm, respectively, which are equal to that in the comparative example 2. Further, the chromatic aberration at the wavelength 407 nm in the example 2 is 0.08 μm/nm, which is substantially equal to 0.07 μm/nm in the comparative example 2. It is thus possible to improve the lens shift characteristics at the wavelength 785 nm while maintaining suitable chromatic aberration correction.

TABLE 15

| Wavelength (nm) | Example 2 | Comparative example 2 |
|---|---|---|
| 407 | 0.08 | 0.07 |
| 658 | −0.12 | −0.12 |
| 785 | −0.05 | −0.05 |

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A coupling lens for chromatic aberration correction placed between a light source and an objective lens for focusing light beams with a plurality of wavelengths on an information recording surface of an optical recording medium, at least one surface of the coupling lens including a plurality of annular zones having a step concentric with an optical axis, wherein when a wavelength $\lambda_1$=380 to 430 nm and a height of the step is d=$m_1\lambda_1/(n_1-1)$ where $m_1$ is an actual number and $n_1$ is a refractive index of the coupling lens at the wavelength $\lambda_1$, $9.9 \leq m_1 \leq 10.1$ is satisfied.

2. The coupling lens according to claim 1, wherein the plurality of wavelengths include the wavelength $\lambda_1$, a wavelength $\lambda_2$=630 to 690 nm, and a wavelength $\lambda_3$=760 to 810 nm.

3. The coupling lens according to claim 2, wherein when a height of the step is d=$m_2\lambda_2/(n_2-1)$=$m_3\lambda_3/(n_3-1)$ where $m_2$ and $m_3$ are actual numbers and $n_2$ and $n_3$ are refractive indexes of the coupling lens at the wavelengths $\lambda_2$ and $\lambda_3$, $5.9 \leq m_2 \leq 6.1$ and $4.9 \leq m_3 \leq 5.1$ are satisfied.

4. The coupling lens according to claim 1, wherein the annular zones have different aspherical shapes from each other.

5. The coupling lens according to claim 1, wherein the annular zones have a width such that wavefront aberration in each annular zone is 0.035$\lambda$ or smaller at the wavelengths $\lambda_1$, $\lambda_2$ and $\lambda_3$.

6. An optical pickup device comprising the coupling lens according to claim 1.

7. A coupling lens for chromatic aberration correction placed between a light source and an objective lens for focusing light beams with a plurality of wavelengths on an information recording surface of an optical recording medium, at least one surface of the coupling lens including a plurality of annular zones having a step concentric with an optical axis, wherein when a height of the step formed within an effective radius A at a specific wavelength $\lambda$ in which a light beam output from the coupling lens is finite is $d_A$, and a height of the step formed in a region through which a light beam with the specific wavelength $\lambda$ can pass only when an optical axis of the objective lens shifts from the optical axis of the coupling lens is $d_B$, $d_B > d_A$ is satisfied.

8. The coupling lens according to claim 7, wherein $d_A = 10.0 * \lambda_1/(n_1-1)$ is satisfied where $n_1$ is a refractive index at the wavelength $\lambda_1 = 380$ to 430 nm.

9. The coupling lens according to claim 8, wherein $d_A < d_B \leqq 10.1 * \lambda_1/(n_1-1)$ is satisfied.

10. The coupling lens according to claim 7, wherein the specific wavelength $\lambda$ that becomes finite light is $\lambda = 760$ to 810 nm.

11. The coupling lens according to claim 7, wherein the plurality of wavelengths include the wavelength $\lambda_1 = 380$ to 430 nm.

12. The coupling lens according to claim 7, wherein the plurality of wavelengths include the wavelength $\lambda_2 = 630$ to 690 nm.

13. The coupling lens according to claim 7, wherein the annular zones have different aspherical shapes from each other.

14. The coupling lens according to claim 7, wherein the objective lens is a compatible lens.

15. An optical pickup device comprising the coupling lens according to claim 7.

* * * * *